United States Patent [19]

Tang

[11] Patent Number: 5,469,889

[45] Date of Patent: Nov. 28, 1995

[54] MIXING VALVE WITH A COLLARED BALL VALVE

[75] Inventor: Tage D. Tang, Vejle, Denmark

[73] Assignee: Masco Corporation, Taylor, Mich.

[21] Appl. No.: 295,639

[22] PCT Filed: Sep. 22, 1992

[86] PCT No.: PCT/US92/07939

§ 371 Date: Aug. 25, 1994

§ 102(e) Date: Aug. 25, 1994

[87] PCT Pub. No.: WO93/18325

PCT Pub. Date: Sep. 16, 1993

[30] Foreign Application Priority Data

Mar. 12, 1992 [DK] Denmark .................................... 333/92

[51] Int. Cl.⁶ ............................ F16K 11/076; F16K 51/00
[52] U.S. Cl. .................... 137/625.41; 137/636.3; 251/287
[58] Field of Search ............................ 137/625.17, 625.4, 137/625.41, 636.2, 636.3; 251/286, 287

[56] References Cited

U.S. PATENT DOCUMENTS

| | | | |
|---|---|---|---|
| 3,882,897 | 5/1975 | Manoogian et al. | 137/625.4 |
| 4,352,369 | 10/1982 | Lorch | 137/625.41 X |
| 4,449,551 | 5/1984 | Lorch | 137/625.41 |
| 4,662,388 | 5/1987 | Eaton et al. | 137/625.41 X |
| 5,018,553 | 5/1991 | Grassberger et al. | 137/625.41 |

Primary Examiner—John Rivell
Attorney, Agent, or Firm—Reising, Ethington, Barnard and Perry

[57] ABSTRACT

A mixing valve for a faucet has a ball valve (16) mounted for pivotable motion about a longitudinal axis (76) and a second perpendicular axis (86) that is fixed with respect to the pin (84) that extends through the spherical section (42) of the ball valve. Distal ends of the pin are connected to a collar (46) that is fitted about the spherical section (42). The collar has cam stops that abut an edge (102) of the upturned flange (104) of the seating ring (48). The spherical section (42) has inlet openings (90,94) that are configured with convex and concave sections to produce a desired flow pattern.

44 Claims, 8 Drawing Sheets

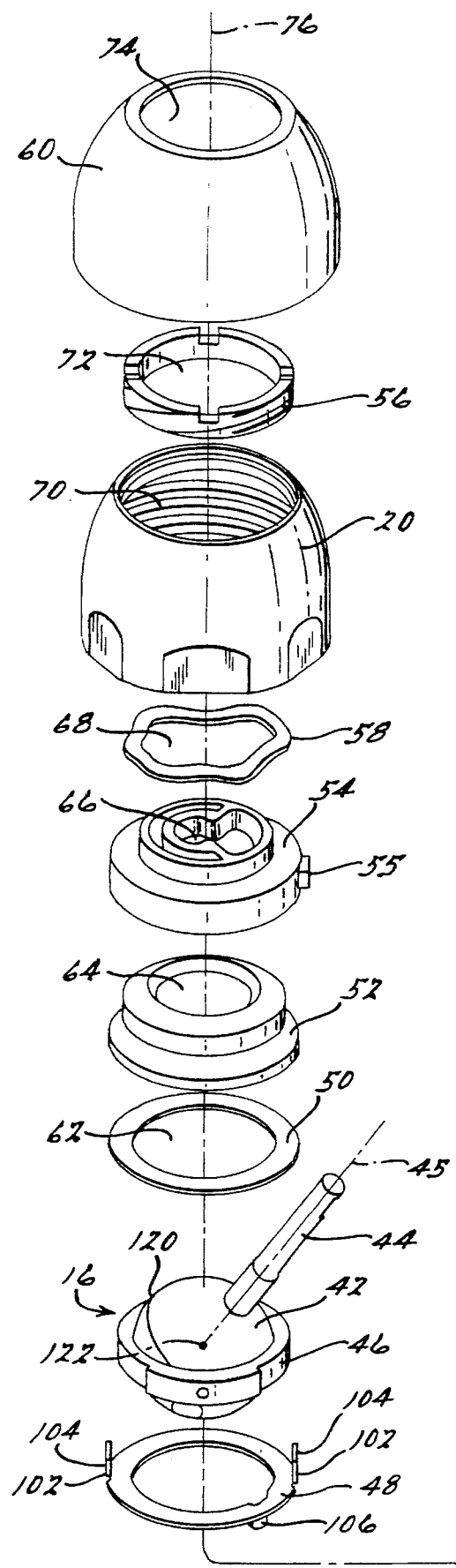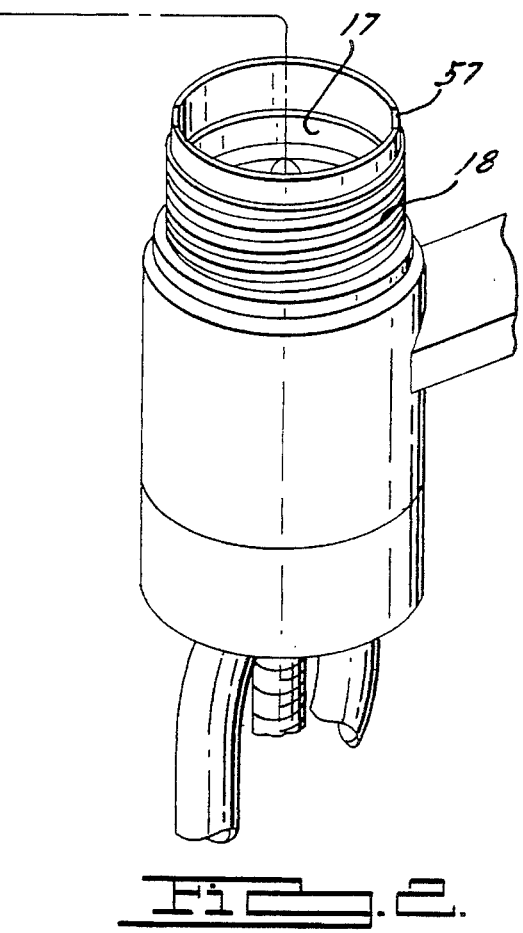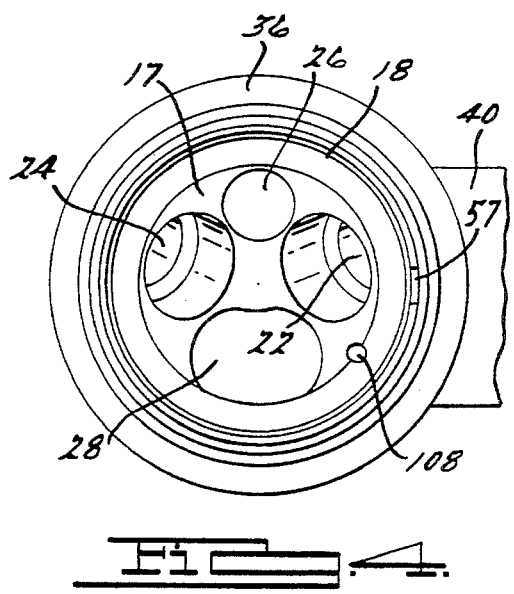

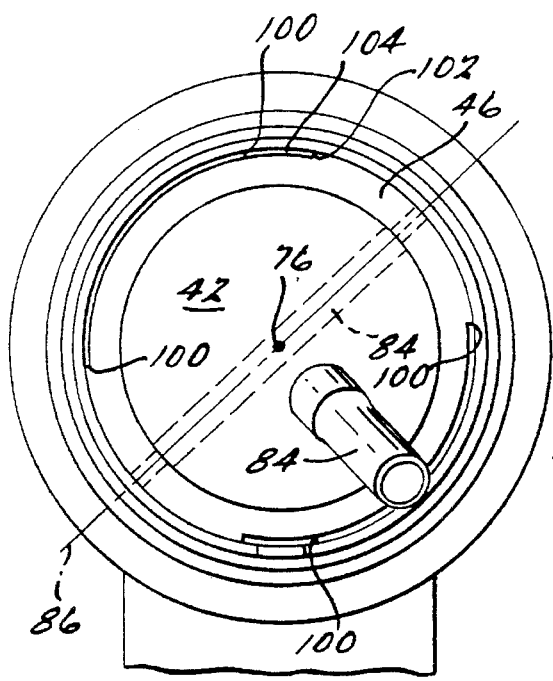
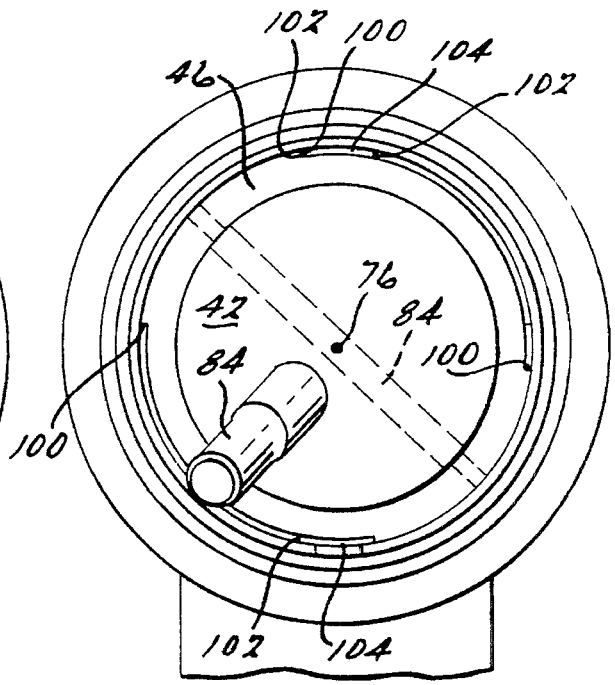
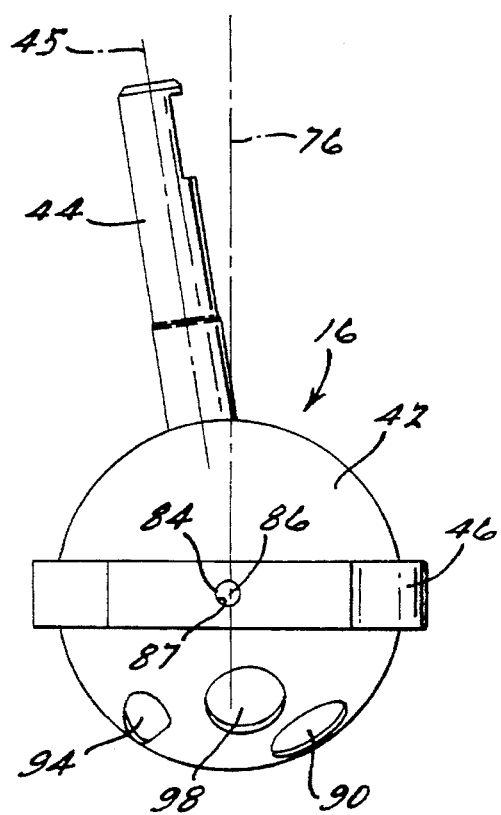
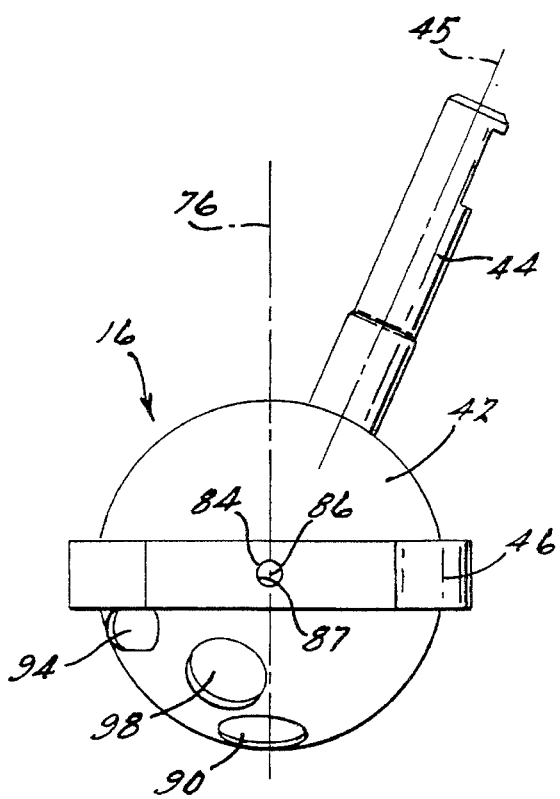

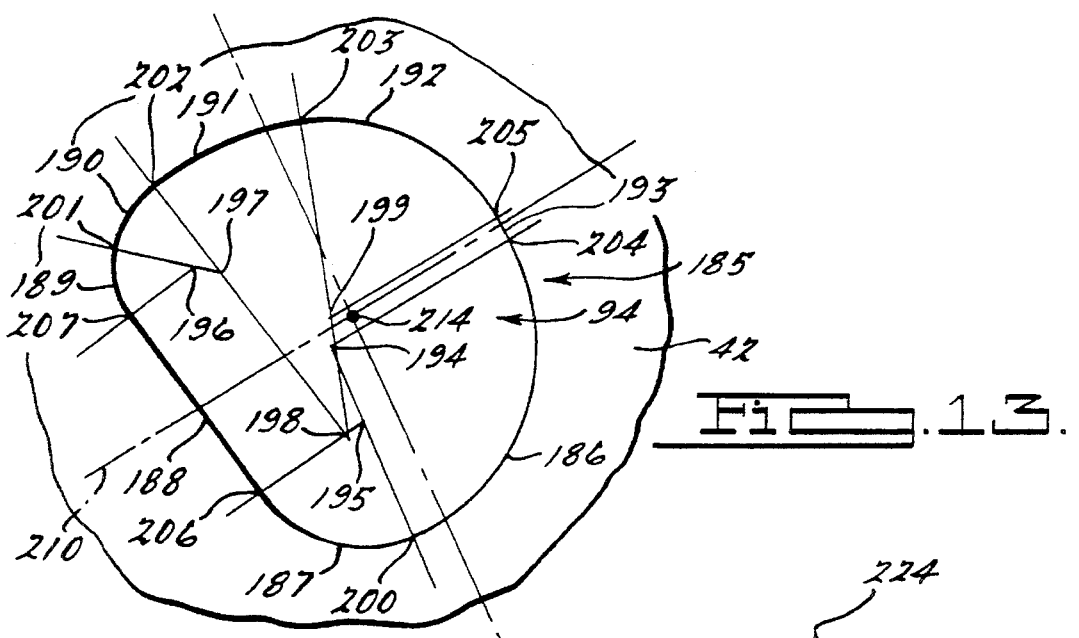
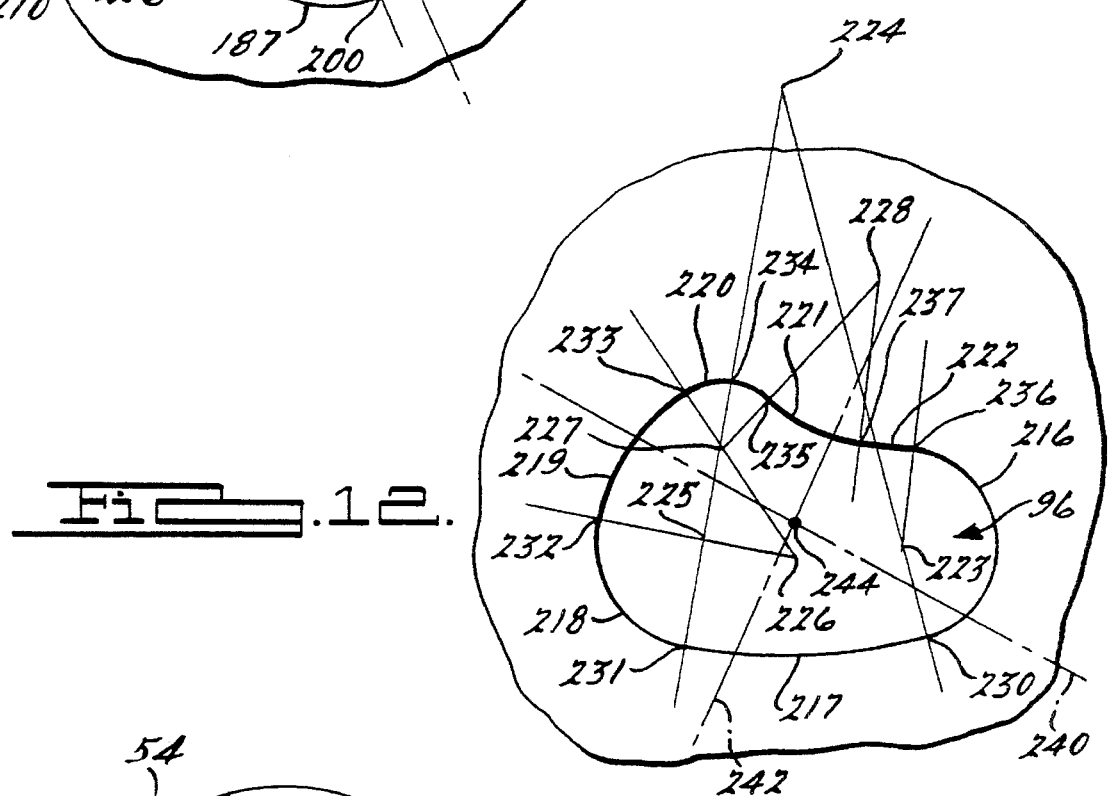
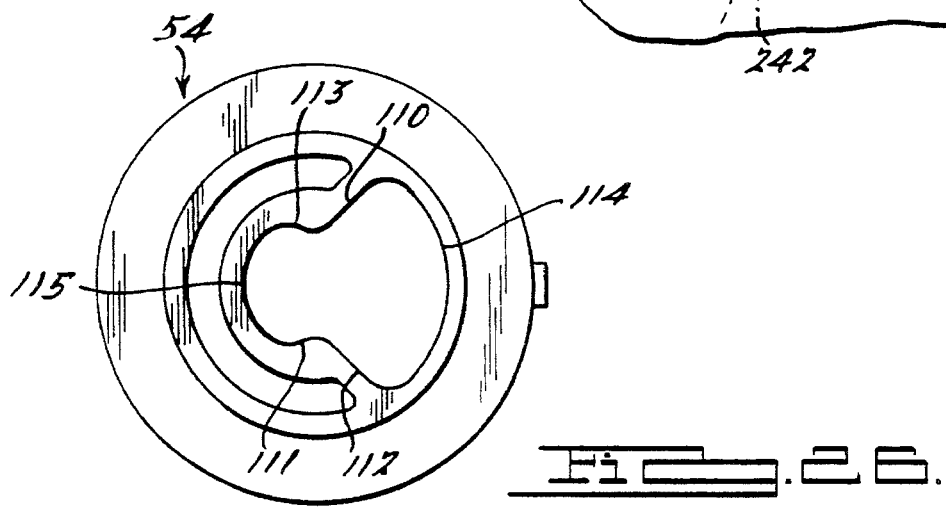

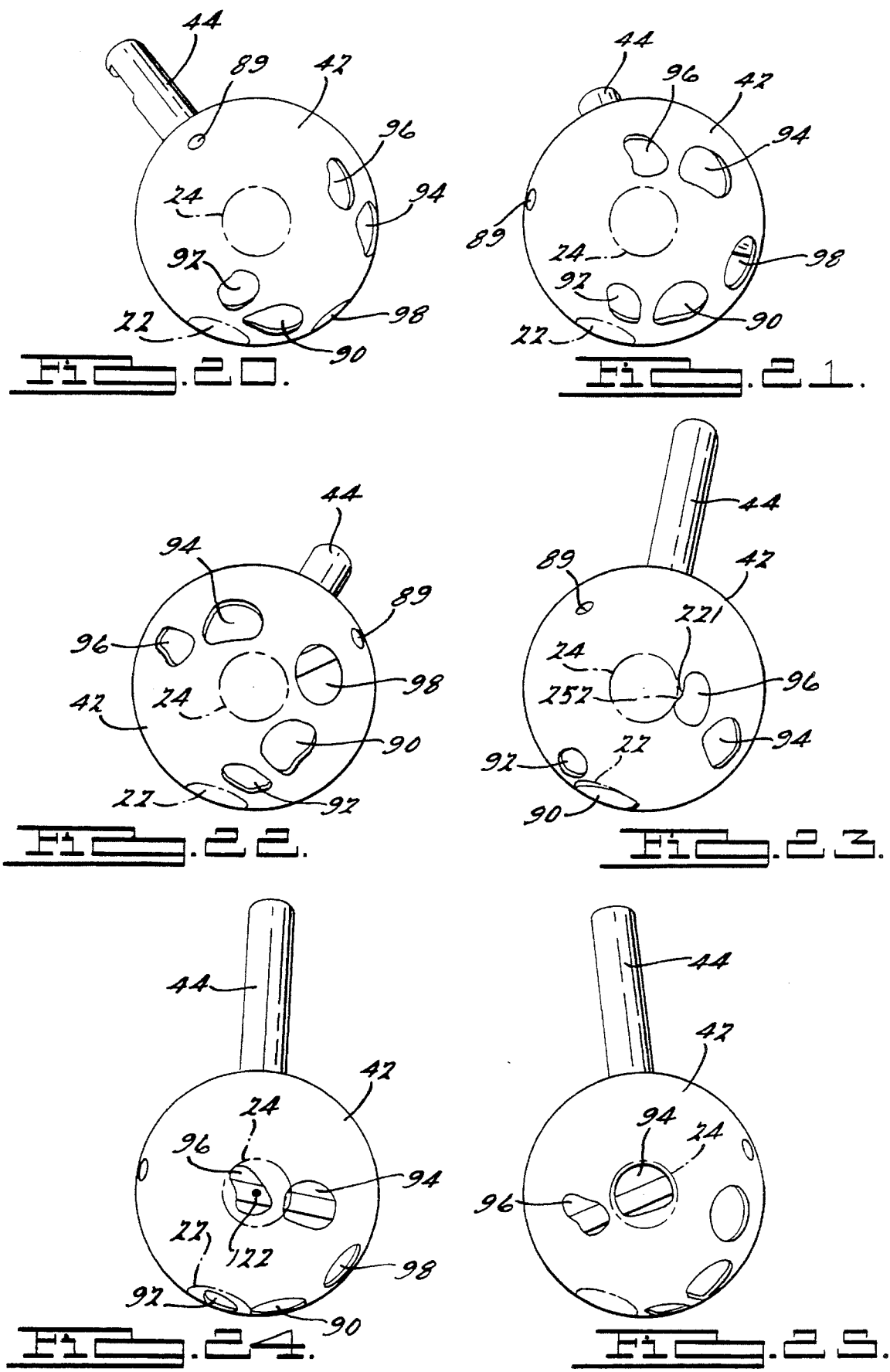

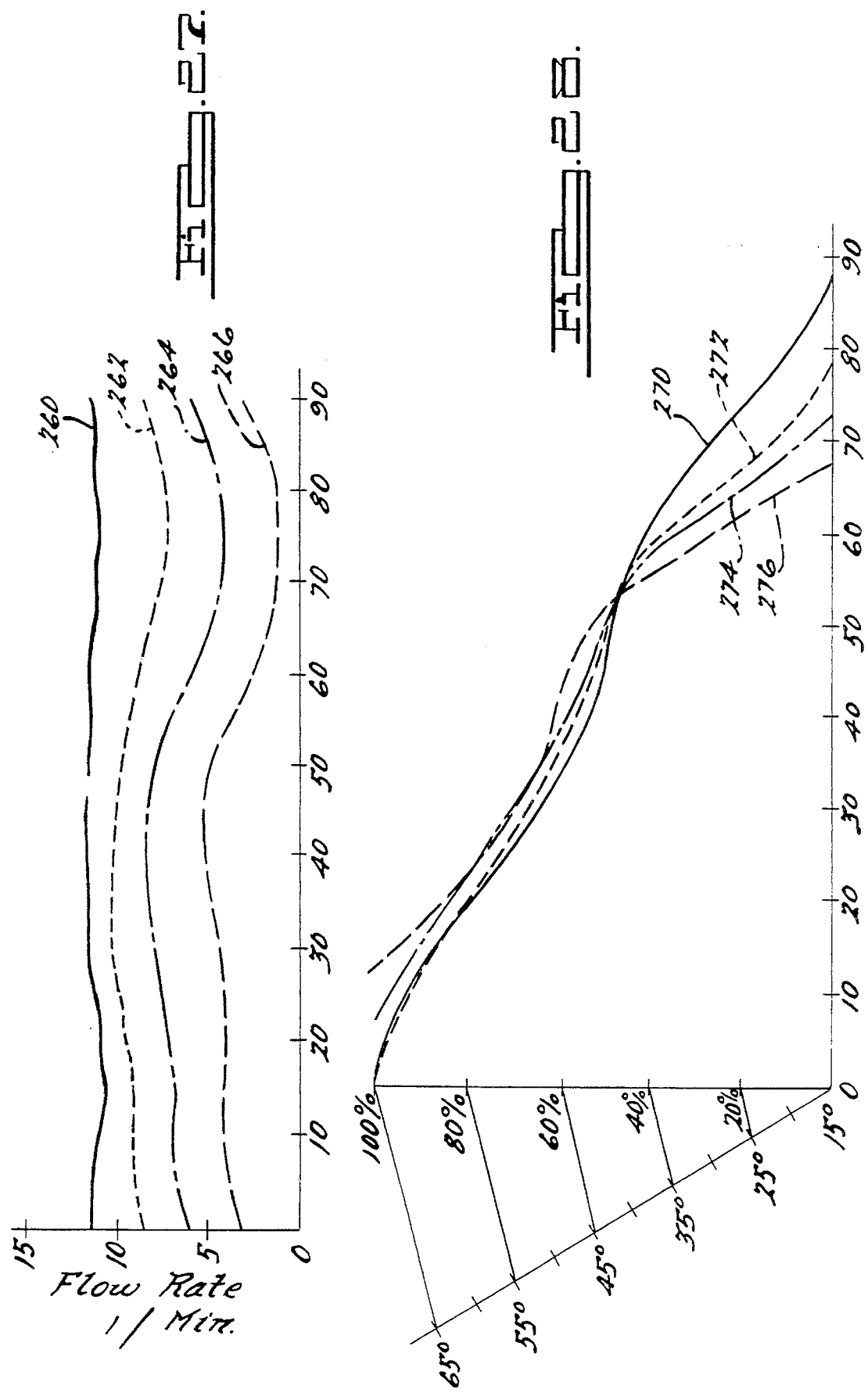

5,469,889

MIXING VALVE WITH A COLLARED BALL VALVE

TECHNICAL FIELD

This invention relates to a faucet mixer valve for liquids incorporating a ball valve element and more particularly to a ball valve mechanism that has pivotable motion about a fixed longitudinal axis of the valve body and shaped ports to provide a desirable flow pattern based on the position of the ball valve.

BACKGROUND OF THE DISCLOSURE

Single handle faucets, commonly referred to as mixer valves, that control the flow of both hot and cold water have seen vast consumer acceptance. The faucets are commonly constructed such that a handle or knob is movable in two distinct direction to adjust the mix of hot and cold water and to adjust the volume rate or flow.

Two basic types of single handle mixer valves that have seen wide commercial acceptance are plate valves and ball valves. A ball valve faucet is renowned for reliable and durable one piece valve construction that is easily assembled. The handle is rigidly fastened to the ball valve element with no intermediate moving parts to provide for a durable and reliable construction. A plate valve faucet on the other hand offers a drive mechanism that allows motion of the handle in two predefined directions that has found worldwide commercial acceptance. This internationally accepted handle motion allows for an orbiting motion of the handle about a fixed axis of the valve body and a rocking, i.e. pivoting motion about a axis that moves with respect to the valve housing as the handle orbits about the fixed axis. The moving axis is perpendicular to the fixed axis of the valve housing.

A characteristic of this type of handle motion allows for the faucet to be turned off and the mix ratio of hot and cold water to be remembered by the location of the handle so that when the faucet is turned back on, one has the option of obtaining the same mix of hot and cold water flow through the faucet. This type of motion has made plate valve faucet commercially successful even in view of the more complicated linkage necessary between the handle and plate valve element.

Recently, ball valves have been devised that allow the handle to operate in the same fashion as the above described plate type mixer valves. The system is disclosed in U.S. Pat. No. 4,449,551 issued to Lorch on May 22, 1984. Another system is disclosed in PCT application PCT/US91/07816 filed on Oct. 22, 1991 by Dr. Alfons Knapp and is incorporated herein by reference. These systems combine the advantage of an ergonomic desirable handle motion with the high reliability of a ball valve faucet design.

Besides reliability of the faucet, a mixing valve must possess other characteristics to be commercially acceptable. The maximum flow rate must be sufficiently great and the noise level of operation must be sufficiently low. Another characteristic is that the faucet must operate in an ergonomic friendly or intuitive way. The ergonomic friendly characteristic has several identifiable qualities. Firstly, the flow rate and temperature mix must be predictable based on continuous motion of the handle. No abrupt or sudden changes in either flow rate or temperature mix is acceptable based on small amounts of motion of the handle. It is desirable that when the temperature mix is adjusted, the flow rate remain approximately constant. On the other hand, when the flow rate is adjusted, substantial, sudden and unpredictable temperature change is not acceptable. A dead zone at the cold end of the handle motion should exist where no mixing of hot water occurs for a limited angular motion of the handle from the full cold position.

It is desirable that a comfort zone exist whereby in a mixed position, an area of greater movement of the handle is needed to produce a predetermined temperature change as compared to handle movement in the hot or cold region. The comfort zone allows the faucet to be more finely adjusted when the temperature is within a certain range. As such, the graph profile of the handle motion plotted against temperature of discharged water resembles an s-curve. However, the comfort zone must not be overly flat, otherwise insufficient change of temperature occurs and an operator then overcompensates with excessive handle motion thereby leaving the comfort zone and receive surprising temperature changes in the discharged water. The handle motion for volume at a predetermined comfort temperature also desirably produces no temperature change.

The above desirable qualities must all be achieved by choosing the proper size ball valve element, defining the drive motion of the handle to adjust volume and temperature of the ball valve element, and prescribing the range of angular and rotational motion for the two defined drive motions of the handle. The correct locations and configurations of the inlet ports of the valve housing and the inlet openings of the ball valve element also provide the above desirable qualities.

The selection of the size of the ball is relatively constrained by the balancing desires of reducing the size of the faucet body and providing for adequate water flow through the valve element. The prescribed drive motion for the handle by commercial desirability is angular motion about a vertical axis substantially for temperature change and rocking motion about a horizontal axis substantially for flow rate adjustment. The range of motion for angular temperature change is limited by ergonomics to a maximum of one hundred and eighty (180) degrees and desirably in the range of ninety (90) degrees. Therefore, the qualities of a desirable faucet with no sudden temperature changes or volume changes and a desirable comfort zone with predictable flow rate and temperature changes in the operation of the mixing valve are most expeditiously achieved and adjusted by the proper selection of the size, location and configurations of the inlet ports in both the housing and inlet openings in the ball valve.

What is needed is ball valve for a faucet mixing valve that has the commercially desirable drive motion that is easy to install and provides for longevity of the existing sealing elements.

What is also needed is a single handle mixing valve for a faucet that incorporates a ball valve with shaped inlet openings that provide for intuitively predictable flow rates and temperature of the discharged water therethrough.

SUMMARY OF THE DISCLOSURE

In accordance with one aspect of the invention, a faucet mixer valve has a ball valve pivotably mounted in a valve receiving cavity of a housing body. The body has a plurality of ports in fluid communication with the cavity. The ball valve has a plurality of openings in an outer at least partially spherical valve surface with the openings cooperating with the ports to control liquid flow in both flow rate and temperature mix through the ports. The valve body has a control opening therethrough with a longitudinal axis of the valve body passing through the control opening. The ball valve has a first projection in the form of a control stem connected thereto and extending through the control opening. An operating handle is affixed to the control stem. The ball valve has a second projection extending therefrom and has its axis substantially perpendicular to a longitudinal axis of said stem. The second projection has a lateral outer end connected to a circular collar bearing that extends about said ball valve. The collar bearing has a lower surface slidably abutting an annular support surface in the housing body about the ball valve.

Preferably, the annular support surface is a separate ring seat member mounted in the valve cavity and has at least one flange to define in part a cold limit and a hot limit to provide a stop of rotatable motion of the ball valve about the longitudinal axis of the mixing valve body beyond the hot and cold limits. The collar bearing has at least one radially outward cam having at least one side edge for engagement against the flange at the cold limit and hot limit of the ball valve. The ring seat member has a downwardly extending flange fitted within a recess in the body such that the ring member is rotatably fixed with respect to the body about the longitudinal axis of the body.

A flat bearing member is preferably positioned such that a lower surface thereof slidably abuts an upper surface of the collar bearing and an upper surface of the flat bearing member abuts a sealing member lower periphery about the ball valve. The flat bearing member is constructed to be relatively stationary as the collar bearing and the ball valve are rotated about the longitudinal axis of the housing body.

The second projection is rigidly affixed to the collar bearing and pivotably connected to the ball valve. The second projection is formed by a distal end of a pin that passes through the ball valve. The pin has opposite distal ends that extend outwardly from the ball valve surface and each is affixed to the collar bearing member.

Desirably, the plurality of openings of the ball valve are shaped and positioned on the ball valve with respect to the ports in valve body such that when the ball valve is in a position to provide for a mix of hot and cold water through the mixing valve, the ball valve provides a temperature shift toward a predefined comfort temperature when the ball valve is adjusted from a throttled position in proximity to an off position toward a full flow position.

Preferably, the ball valve has two openings for allowing entry of cold water from the cold water port and two openings for allowing entry of hot water from a hot water port. One of the openings through the ball valve has a concave edge section to modulate flow therethrough. Desirably, one of the openings with the concave edge allows entry of cold water therethrough and one of the openings with a concave edge allows entry of hot water therethrough.

The openings with the respective concave edge have a peripheral shape defined by at least five radial arcs having a respective radial center. At least four of the radial centers are located within the periphery of said respective opening and one radial center is located outside of the periphery of the opening at the side of the concave edge section. Preferably, the remaining openings have convex peripheries defined by at least five radial arcs having a respective radial center, and at least two of the radial arcs of each opening are joined at a point sharing a common tangent line. Preferably, each of the radial arcs are joined to another radial arc at a point sharing a common tangent line or alternately to a straight edge section at a point having a tangent line coinciding with the straight edge.

In one embodiment, the openings include a full cold water opening constructed and positioned for allowing only cold water entry when the hot water port is closed off, a mixed cold water opening positioned and constructed for allowing cold water entry simultaneously with hot water entry from said hot water port, a full hot water opening constructed and positioned for allowing only hot water entry when the cold water port is closed off, and a mixed hot water opening positioned and constructed for allowing hot water entry simultaneously with cold water entry from the cold water port. The full cold water opening has a respective concave edge, and the mixed hot water opening has a respective concave edge. In addition, a mixed cold water opening has a straight edge section opposing an edge of said cold water port when said ball valve is in an off-mix position, and a mixed hot water opening has a straight edge section opposing an edge of the hot water port when the ball valve is in the off-mix position.

BRIEF DESCRIPTION OF THE DRAWINGS

Reference now is made to the accompanying drawings in which:

FIG. 2 is an exploded perspective view of the mixing valve shown in FIG. 1;

FIG. 4 is a plan view of the mixing valve lower housing member;

FIG. 5 is a plan segmented view of the mixing valve with the cap and seal elements removed illustrating the ball valve in the full cold position;

FIG. 6 is view similar to FIG. 5 illustrating the ball valve rotated to the full hot position;

FIG. 7 is a side elevational view of the ball valve rocked to a full on position;

FIG. 8 is a side elevational view of the ball valve rocked to an off position;

FIG. 12 is an enlarged view of the hot mix opening through the ball valve;

FIG. 13 is an enlarged view of the full hot opening through the ball valve;

FIG. 20 is a perspective view of through the hot port of the valve housing of the ball valve in the off-full cold position;

FIG. 21 is a view similar to FIG. 20 wherein the ball valve is in the off-full mix position;

FIG. 22 is a view similar to FIG. 20 wherein the ball valve is in the off-full hot position;

FIG. 23 is a view similar to FIG. 20 wherein the ball valve is in the full on-full cold position;

FIG. 24 is a view similar to FIG. 20 wherein the ball valve is in the full on-full mix position;

FIG. 25 is a view similar to FIG. 20 wherein the ball valve is in the full on-full hot position;

FIG. 26 is a plan view of the template member;

FIG. 27 is a graph illustrating the flow rate profile at various temperatures;

FIG. 28 is a graph illustrating the temperature profile at various flow rates;

DETAILED DESCRIPTION OF THE PREFERRED EMBODIMENTS

Figure 1:
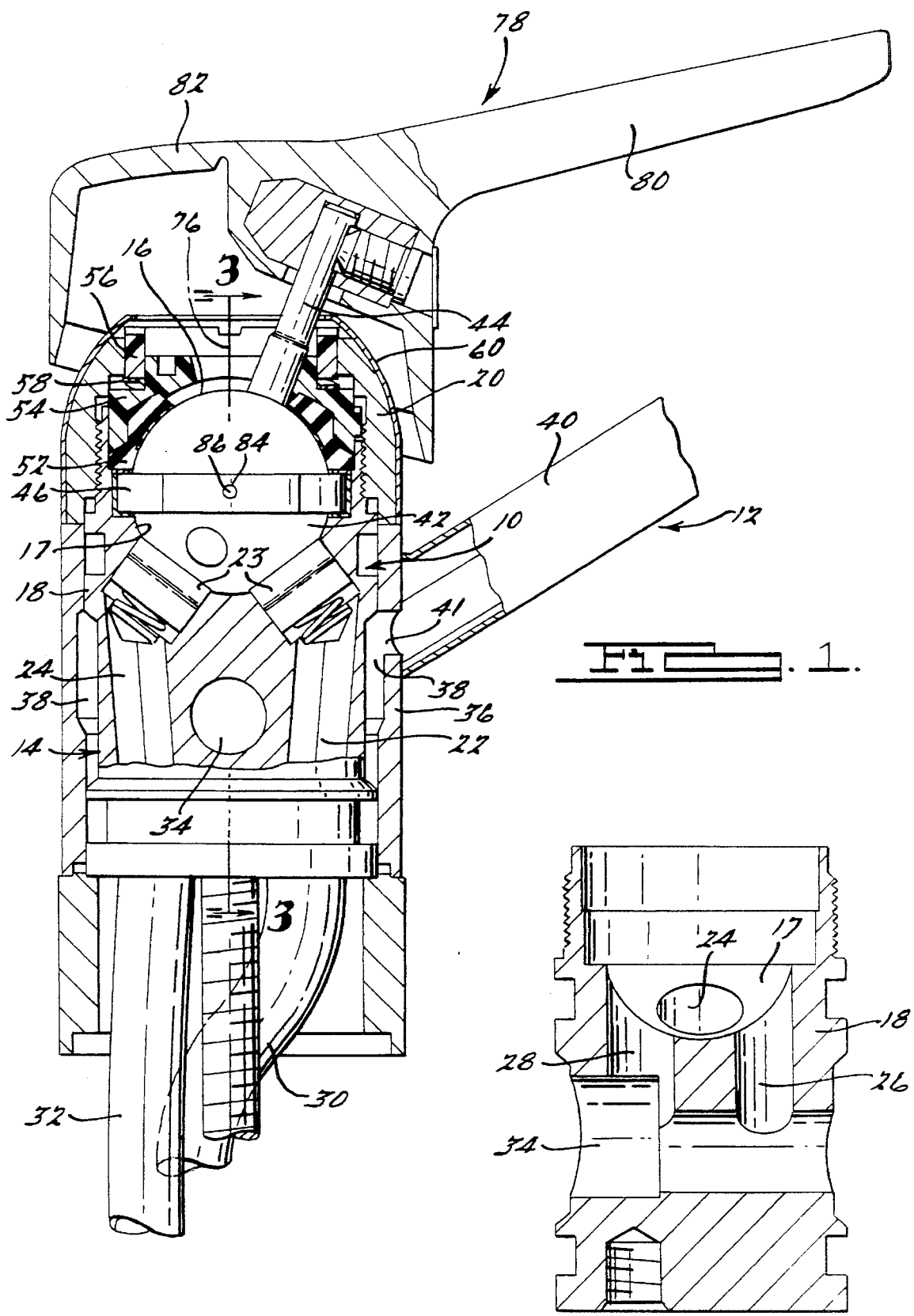
FIG. 1 is a side elevational and segmented view of a mixing valve according to one embodiment of the invention.

Referring now to FIG. 1, a mixing valve 10 for a faucet generally indicated as 12 includes a valve body 14 and a ball valve 16 operably mounted therein. The ball 16 is seated in a cavity 17 of the body 14 defined between a lower base member 18 and upper body member, i.e. cap member 20. The base member 18 has two inlet ports 22 and 24 therethrough that are in communication with the cavity 17. Each port 22 may have conventional spring biased elastomeric gaskets 23 mounted at its downstream end with the holes therethrough having a diameter of approximately 6.5 mm. The ports 22 and 24 have there downstream ends positioned at approximately 40° up from the bottom of cavity 17. Furthermore, the ports as shown in FIG. 4 are circumferentially positioned approximately 15° from the fore and aft plane as measured from the vertical axis 76.

Figure 3:
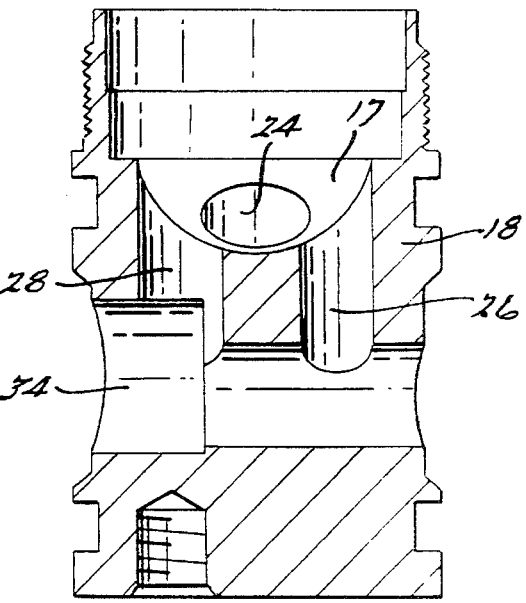
FIG. 3 is cross-sectional view of the mixing valve lower housing member taken along line 3—3 shown in FIG. 1.

As shown more clearly in FIG. 3, the base member 18 also has two discharge ports 26 and 28 therethrough. Two supply pipes 30 and 32 are operably connected to the respective inlet ports 22 and 24. The two discharge ports 26 and 28 lead from the cavity 17 and are in communication with a traverse outlet duct 34. A tubular shell 36 is sealingly and slidably mounted about the body 14 and forms an annular chamber 38 in fluid communication with the traverse duct 34. A spout 40 is affixed to the shell and in fluid communication with the annular chamber 38 through aperture 41 in shell 36.

As shown in FIGS. 1 and 2, the ball valve 16 has a spherical surface section 42 and a control stem 44 extending generally upwardly therefrom. The stem 44 is aligned normal to the surface 42 such that its axis 45 intersects the center 122 of the spherical section 42. The spherical section may have a diameter of approximately 25 mm. A collar 46 fits about the equator 120 of the spherical section 42. The equator 120 lies in a plane normal to the axis 45 of stem 44. The collar 46 is interposed between two seating rings 48 and 50. A sealing gasket 52 of elastomeric material fits on top of seating ring 50. The sealing gasket is retained in place by a template guide 54. The template guide 54 is retained in place within the inner periphery of the cap member 20 by a threaded annulus 56. The template guide 54 is rotationally affixed by its key 55 fitting into slot 57 at the top edge of housing member 18. A spring loaded corrugated disc 58 is interposed between the guide 54 and annulus 56 for downwardly biasing the guide 54 and sealing gasket 52 against the spherical section 42 of ball valve 16. The cap member 20 is threadably engaged to the bottom base member 18. A cosmetic shell 60 is positioned over the cap member 20.

The seating ring 50, sealing gasket 52, template guide 54, spring ring 58, cap 20, annulus 56 and shell 60 all have respective apertures 62, 64, 66, 68, 70, 72, and 74 therethrough to allow control stem 44 of the ball valve 16 to extend out of body 14 of the faucet. The longitudinal axis 76 of the faucet extends through the apertures 62–74.

The stem 44 is affixed to a handle 78 that has an operating lever 80 and concealing cap section 82. By manual manipulation of the handle 78, either or both of the inlet ports 22 and 24 may be brought into fluid communication with the discharge passages 26 and 28 via through inlet openings 90, 92, 94, 96 and discharge opening 98 in the ball valve 16 for flow out the faucet spout 40.

As shown more clearly in FIGS. 5, 6, 7, 8, and 9, the ball spherical surface section 42 has a pin member 84 passing through the center of the ball valve spherical section 42. The pin 84 has its longitudinal axis 86 substantially perpendicular to the longitudinal axis 76. The pin 84 has two cylindrical distal ends 88 that extend externally of spherical section 42 at an equator of the spherical section 42. The ends 88 are affixed within two holes 87 at opposing circumferential ends of collar 46. The ends 88 extend through opposing holes 89 in spherical section 42 for pivotable motion with respect thereto about longitudinal axis 86.

This pivotable motion allows the stem 44 to be manipulated back and forth in a rocking motion to pivot the spherical section about the axis 86 of pin 84 with respect to the collar as shown in FIGS. 7 and 8. FIG. 8 represents the off position of the ball valve with the stem 44 tilted forward at approximately 25° from the vertical axis 76. FIG. 7 represents the full on position of the ball valve with the stem 44 tilted rearwardly approximately 10° from the vertical axis 76.

The ball valve may also rotate about vertical axis 76 from a cold position as illustrated in FIG. 5 to a hot position as illustrated in FIG. 6. The rotation about axis 76 may be limited to a desired amount for example 90° or 180°. One way to limit the rotation is to provide the collar 46 with radially extending cams 100 that may be abuttable against an edge 102 of an upright flange 104 upwardly extending from seating ring 48. Ring 48 as clearly shown in FIG. 2 has two flanges 104 positioned 180° apart. The ring 48 is affixed in place within cavity 17 by a downwardly extending tongue 106 that is pressed into a receiving hole 108 within cavity 17.

The collar 46 is circumferentially moved as the ball valve is rotated about vertical axis 76. Elastomeric seal 52 is stationary. In order to prevent frictional wear of the lower edge of the elastomeric seal 52 by collar 46, the smooth metal seating ring 50 is interposed between the collar 46 and seal 52. The collar 46 slides against the ring 50 when the ball is rotated about axis 76.

Alternately, or in addition to the seating ring 48, the rotation of the ball about axis 76 may also be limited by radially extending edges 110, 111, 112, and 113 at the periphery of aperture 66 in guide template 54 as shown in FIGS. 2 and 26. The stem 44 when it abuts the edges 110—113 is prevented from further movement beyond the respective edges. Edges 110 and 111 define the cold limit and edges 112 and 113 define the hot limit. The edges 110—113 allow the ball to rotate about vertical axis 76 for approximately 90°. The aperture 66 also has circumferential edges 114 and 115 that control the extent of rocking motion about axis 86 of pin 84 from the off position to the full on position respectively as illustrated in FIGS. 7 and 8.

The collar 46, ring 48, and guide template 54 determine the prescribed motion of the control stem 44 and handle 78 and the extent of motion of the stem 44 and handle 78 between the full off, full on full cold and full hot positions. The control stem 44 is free to be in any position within aperture 66 of guide template 54 to control of water flow from the inlet ports 22 and 24 to the discharge ports 36 and 38.

The flow profile from off to full-on and from hot to cold at various flow rates is determined by the proper selection of the size, location and configurations of the inlet ports 22 and 24 at the cavity 17 and inlet openings 90, 92, 94, and 96 in the ball valve. The openings 90, 92, 94, 96, and 98 lie generally along a circle 118 that forms an angle of approximately 80° with the stem axis 45. The plane of the circle 118 is generally parallel to axis 86 of pin 84.

Figure 9:
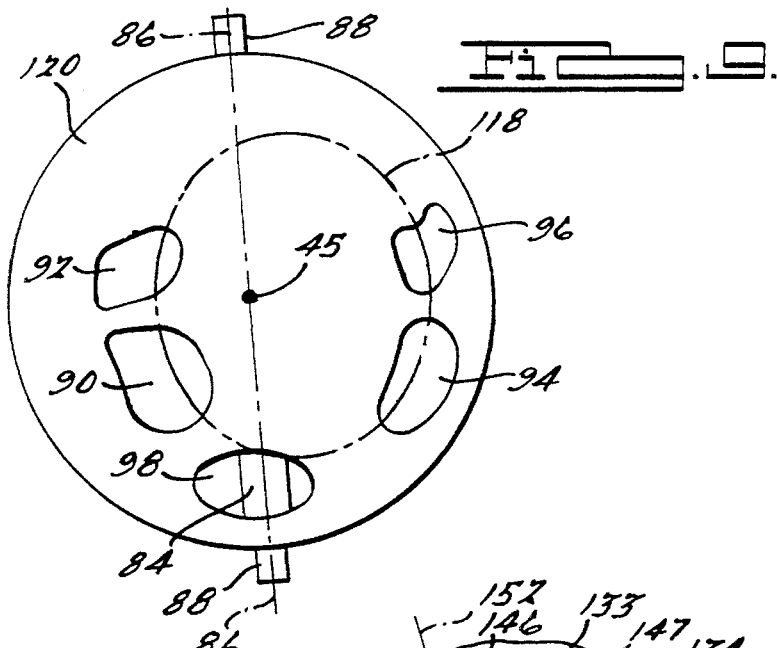
FIG. 9 is a bottom plan view of the spherical section of the ball valve with the collar removed.

In more specific terms, the locations of the openings can be defined in angular terms. The discharge opening 98 may be bisected by a reference plane. Openings 90 and 92 form angles at approximately 50° and 106° clockwise from the bisected discharge opening 98 reference plane as shown in FIG. 9. Openings 94 and 96 form angles at approximately 66° and 107° counterclockwise to the bisected discharge opening 98.

The vertical position can be defined with reference to a plane that contains the equator 120 of the spherical section and the center 122 of spherical section 42. The discharge opening 98 forms an angle with the reference plane at center 122 of approximately 38°. Openings 90 and 92 forms an angle of 60°. Opening 94 forms an angle of approximately 39°. Opening 96 forms an angle of approximately 40°. All angles are referenced with respect to a designated center of the respective opening which is further described later.

Figure 10:
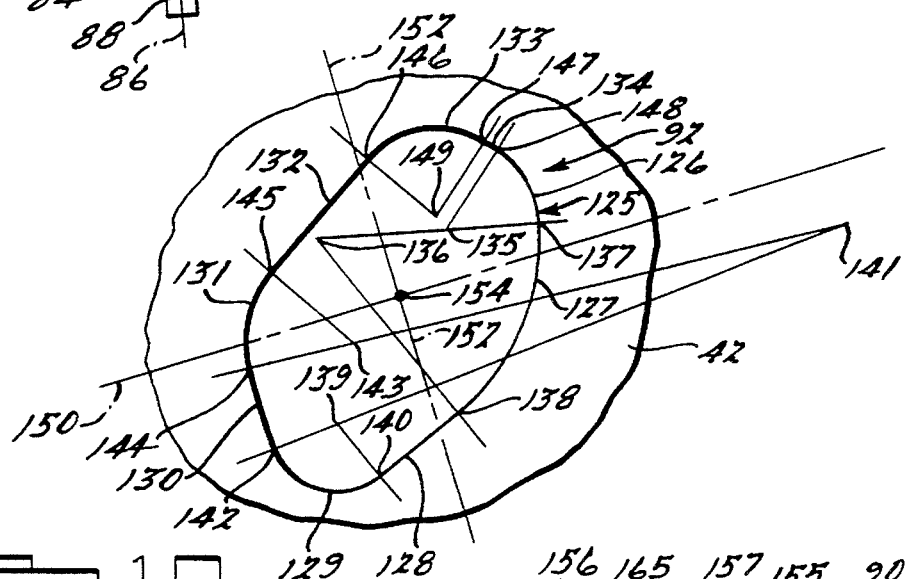
FIG. 10 is an enlarged view of the cold mix opening through the ball valve.

While the discharge opening 98 has a generally circular opening for the discharge of water from the interior of the ball valve 16, each of the inlet openings 90, 92, 94, and 96 have asymmetrical and more complex shapes. Referring now to FIG. 10, the cold mix inlet opening 92 has a peripheral edge generally indicated as 125 several contoured sections 126–134. The peripheral edge 125 forms a simple convex shape. Section 126 is defined as a 1.42 mm radial arc centered at radial center 135. Section 127 is a 3.30 mm radial arc centered at radial center 136. The junction point 137 between section 126 and 127 is the point sharing a common tangent. Section 127 is joined to a straight edge section 128. The junction point 138 between the sections 127 and 128 is where the tangent line of the arc section 127 coincides with the straight edge section 128. The arc section 129 is a 1.02 mm arc centered about radial center 139 that is similarly connected to straight section 128 at point 140. The arc section 129 is connected to a 9.12 arc section 130 centered about radial center 141 at their common tangent point 142. Arc section 130 is similarly connected to a 1.60 mm arc section 131 centered about radial center 143 at its common tangent point 144. Arc section 131 is joined to a straight edge section 132 where its tangent coincides with straight edge section at point 145. Straight edge section 132 is similarly connected to a 1.35 mm radial arc section 133 about radial center 149 at point 146. Arc sections 133 and 126 are similarly connected to straight edge section 134 at points 147 and 148.

The radial centers are conveniently located by using a vertical plane 150 containing axis 45 of control stem 44 as a first coordinate and an axis 152 perpendicular thereto that contains the designated center 154 of opening 92 as a second coordinate. All coordinates are measured in millimeters. Radial centers 135, 136, 139, 141, 143, and 149 are located at (0.99, 0.91), (–0.86, 1.27), (1.24,–1.47), (6.81, –0.51), (–0.71, –0.41) and (0.94, 1.07).

Figure 11:
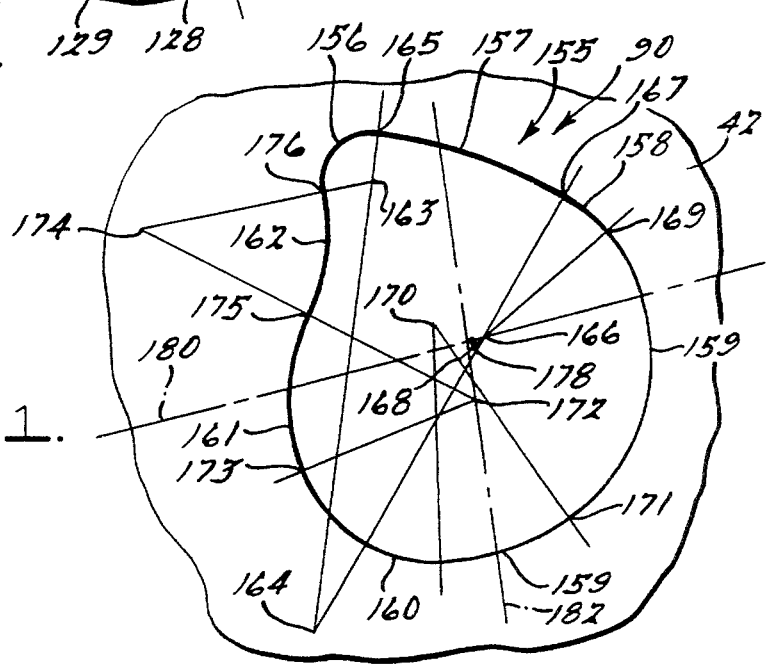
FIG. 11 is an enlarged view of the full cold opening through the ball valve.

Opening 90 for the full cold water flow as illustrated in FIG. 11 has a peripheral edge generally indicated as 155. The peripheral edge 155 is composed of sections 156–162. Section 156 is a 0.71 mm radial arc that is centered about radial center 163. Arc 156 is joined to a 7.44 mm radial arc 157 centered about radial center 164 at common tangent point 165. Similarly, arc 157 is joined to a 2.46 mm radial arc 158 centered about radial center 166 at common tangent point 167. Arc 158 is joined to a 2.87 mm radial arc 159 centered about radial center 168 at common tangent point 169. Arc 159 is joined to a 3.51 mm radial arc 160 about radial center 170 at common tangent point 171. Arc 160 is joined to a 2.79 mm radial arc 161 about center 172 at common tangent point 173. The sections 156–161 are convex sections as references from the exterior of the opening 92. The section 162 is a 2.77 concave arc centered about radial center 174. The section 162 is joined to section 161 and 156 about respective common tangent points 175 and 176.

The coordinates of the radial centers 163, 164, 166, 168, 170, 172 and 174 are (–0.86, 2.74), (–2.90, –3.66), (0.13, 0.33), (–0.08, –0.08), (–0.36, 0.53), (0.08, 0.71), (–4.34, 2.67) with reference to vertical center plane 180 as a first coordinate and perpendicular axis 182 through designated center 178 as the second coordinate. The coordinates are in millimeters.

The opening 94 is has a simple convex periphery 185 composed of radial arc sections 186, 187, 189, 190, 191, and 192 having radii of 2.92 mm from center 194, 1.80 mm from center 195, 1.17 mm from center 196, 1.55 mm from center 197, and 4.52 mm from center 198 respectively. The arcs 186 and 187 are joined at common tangent point 200. The arcs 189–192 are joined at respective common tangent points 201, 202, and 203. The arcs 186 and 192 are joined to straight edge section 193 at points 204 and 205 where the arc tangent coincides with the edge section 193. Similarly arcs 187 and 189 are joined to straight edge section 188 at points 206 and 207 where the arcs' tangents coincide with the straight edge section 188.

The coordinates of the radial centers 194, 195, 196, 197,198, and 199, are (–0.28, –0.25), (–0.36, –1.40), (–1.52, 1.63), (–1.22, 1.37), (–0.66, –1.55), and (–0.10, 0.71) with reference to vertical center plane 210 as a first coordinate and perpendicular axis 212 through designated center 214 as the second coordinate. The coordinates are in millimeters.

The inlet opening 96 illustrated in FIG. 12 has a periphery generally indicated as 215. The periphery 215 has radially convex sections 216–220 having radii of 1.37 mm from center 223, 8.05 mm from center 224, 1.52 mm from center 225, 2.84 mm from center 226, and 0.94 mm from center 227. The concave section 221 has a radius of 2.34 mm from center 228. Section 216–221 are joined at common tangent points 230–235. Sections 216 and 221 are joined to straight edge section 222 at points 236 and 237 respectively where the tangents coincide with the straight edge 222.

The coordinates of the radial centers 223, 224, 225, 226, 227, and 228 are (1.40, 0.76,), (–3.53, 5.28), (–0.97, –0.74), (0.28, 0.28), (–1.45, 0.74), and (–0.89, 3.73) with reference to vertical center plane 240 as a first coordinate and perpendicular axis 242 through designated center 244 as the second coordinate. The coordinates are in millimeters.

Reference is now made to FIG. 14–19 which illustrates the ball valve in various positions from the perspective of the cold water inlet port 22 at cavity 17. The ball valve 16 can be orbited about vertical axis 76 while in the off position such that the ball can be in the cold-off position illustrated in FIG. 14, in the mix-off position illustrated in FIG. 15 and in the hot-off position illustrated in FIG. 16. The stem 44 may also be rocked about pin 84 from the position illustrated in FIG. 14 to the cold-on position illustrated in FIG. 17, from the position illustrated in FIG. 15 to the full mix position illustrated in FIG. 18, and from the position illustrated in FIG. 16 to the hot-on position shown in FIG. 19.

Similarly, FIGS. 20 through 25 illustrate the ball valve in various positions from the perspective of the hot water inlet port 24 at cavity 17. The ball valve 16 can be orbited about vertical axis 76 while in the off position such that the ball can be in the cold-off position illustrated in FIG. 20, in the mix-off position illustrated in FIG. 21 and in the hot-off position illustrated in FIG. 22. The stem 44 may also be rocked about pin 84 from the position illustrated in FIG. 20 to the cold-on position illustrated in FIG. 23, from the position shown in FIG. 21 to the on-mix position shown in FIG. 24 and from the position shown in FIG. 22 to the hot-on position shown in FIG. 25.

Figure 14:
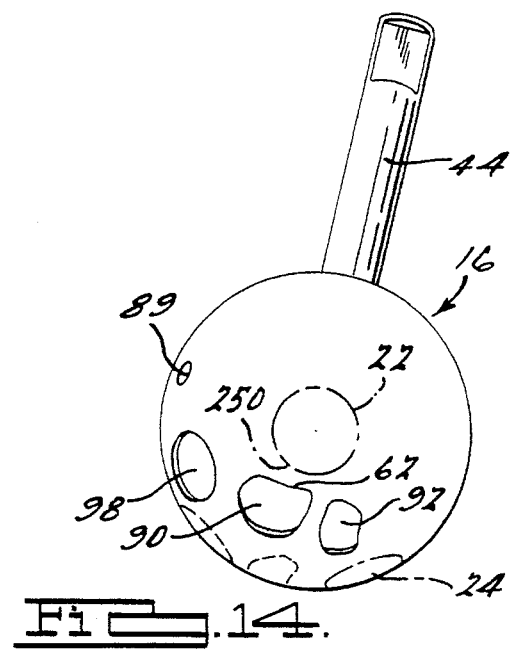
FIG. 14 is perspective view through the cold port of the housing at the ball valve in the off full cold position.
Figure 15:
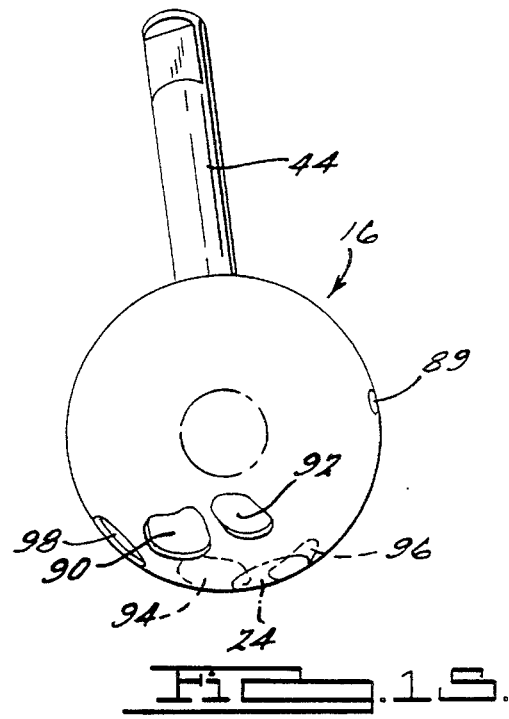
FIG. 15 is a view similar to FIG. 14 wherein the ball valve is in the off-full mix position.
Figure 16:
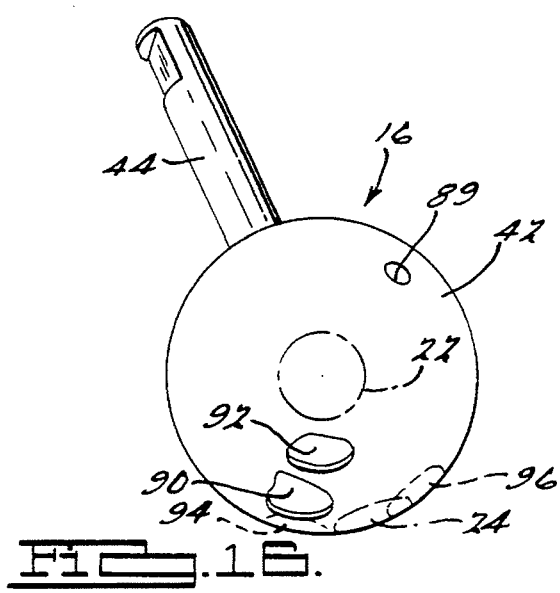
FIG. 16 is a view similar to FIG. 14 wherein the ball valve is in the off-full hot position.
Figure 17:
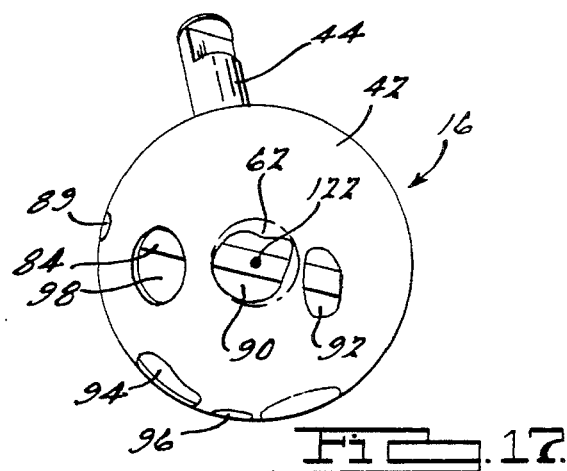
FIG. 17 is a view similar to FIG. 14 wherein the ball valve is in the full on-full cold position.
Figure 18:
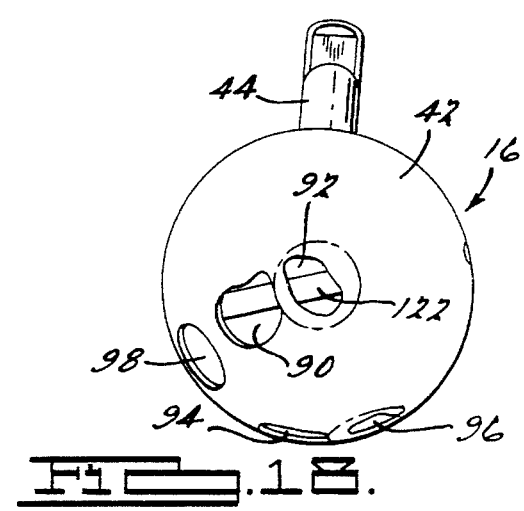
FIG. 18 is a view similar to FIG. 14 wherein the ball valve is in the full on-full mix position.

Referring back to FIG. 14 and 17, the periphery 155 of full cold opening 90 has its concave section 162 act as a leading edge over port 22 from the off to cold on position. As shown in FIG. 14, when in the cold-off position, the ball valve 16 has concave edge 62 opposing and spaced from the inlet edge 250 of port 22. When in the cold-on position, only opening 90 is aligned with any of the inlet port 22 and 24 as illustrated in FIGS. 17 and 23.

Figure 19:
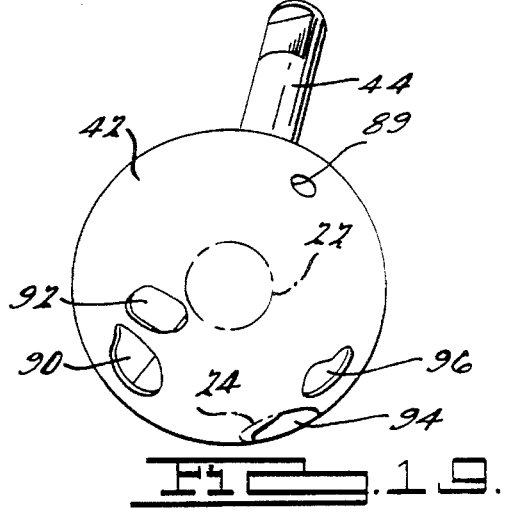
FIG. 19 is a view similar to FIG. 14 wherein the ball valve is in the full on-full hot position.

Referring to FIGS. 15, 21, 18 and 24, when the ball valve is in the full mix positions, only cold mix opening 92 and hot mix opening 96 are aligned with respective cold and hot inlet ports 22 and 24. As shown in FIG. 23 and 24, when in the cold-on position, the ball valve 16 has concave edge 221 opposing and spaced from the inlet edge 252 of hot inlet port 24. When rotated from the cold-on position shown in FIG. 23 to the mix-on position shown in FIG. 24, the ball valve 16 has the concave edge 221 of opening 96 act as a leading edge over leading edge 252 of hot inlet port 24. When in the hot-on position, only opening 94 is aligned with any of the inlet ports 22 and 24 as illustrated in FIGS. 19 and 25.

The above described structure for a mixing valve renders a faucet that provides relatively constant flow rates as the handle 78 is rotated about axis 76 from the full hot position indicated at 0° where the stem 44 abuts either edge 112 or 113 of guide 54 as shown in FIG. 26 to a full cold position indicated at 90° where stem 44 abuts either edge 110 or edge 111 of guide 54. The curve 260 represents the profile at full flow with the handle 78 lifted up until the stem 44 abuts edge 115. Curve 262 represents the profile at ¾ capacity, i.e. ¾ open flow. Curve 264 represents the profile at ½ capacity, i.e. ½ open flow. Curve 264 represents the profile at ¼ flow capacity, i.e. ¼ open flow.

Furthermore, the construction as described renders a faucet that has predictable temperature changes. Referring now to the graph illustrated in FIG. 28, profile curves 270, 272, 274, and 276 represent the percentage mix of the discharge water exiting discharge port 26 and 28 from the hot inlet port 24 and cold inlet port 22 at full flow, ¾ open flow, ½ open flow and ¼ open flow respectively. The percentage from each inlet port 22 and 24 may be translated into a temperature of the discharged water. As shown in the graph, the temperature of the discharged water is calculated basing the temperature of hot water at 65° C. and the cold water at 15° C. At the 55° rotated position, changes in flow rate are completely independent of temperature change. The 55° rotated position represents the comfort temperature of approximately 37° C. Between the 0° to 55° rotated positions where the temperature of the discharged water is hotter, movement of the handle from a partial flow position to full flow is accompanied by a slight decrease in temperature toward the designated 37° C. comfort temperature. Similarly, between the 55° and 90° rotated positions where the temperature of the water is colder, movement of the handle from a partial flow position to full flow is accompanied by a slight increase in temperature toward the designated 37° C. comfort temperature.

It should be understood that the same advantages can be accomplished with larger and smaller balls. The ports and openings may be similarly upscaled or downscaled.

Other variations and modifications are possible without departing from the scope and spirit of the present invention as defined by the appended claims.

The embodiments in which an exclusive property or privilege is claimed are defined as follows.

1. In a faucet mixer valve having a ball valve pivotably mounted in a valve receiving cavity of a housing body, said body having a plurality of ports in fluid communication with said cavity, said ball valve having a plurality of openings in an outer at least partially spherical valve surface, said openings cooperating with said ports to control liquid flow in both flow rate and temperature mix through said ports, said valve body having a control opening therethrough with a longitudinal axis of said valve body passing through said control opening, said ball valve having a first projection in the form of a control stem connected thereto and extending through said control opening, the improvement characterized by;

said ball valve having a second projection extending therefrom and having its axis substantially perpendicular to a longitudinal axis of said stem;

said second projection having a lateral outer end connected to a circular collar bearing that extends about said ball valve; and said collar bearing having a lower surface slidably abutting an annular support surface in said housing body about said ball valve.

2. A faucet mixing valve as defined in claim 1 further characterized by;

said annular support surface being a separate ring seat member mounted in said valve cavity and having at least one flange to define in part a cold limit and hot limit of rotatable motion of said ball valve about said longitudinal axis of said body.

3. A faucet mixing valve as defined in claim 2 further characterized by;

said collar bearing having at least one radially outward cam having at least one side edge for engagement against said at least one flange to define said cold limit and hot limit of said ball valve.

4. A faucet mixing valve as defined in claim 3 further characterized by;

said ring seat member has a downwardly extending flange fitted within a recess in said body such that said ring member is rotatably fixed with respect to said body about said longitudinal axis of said body.

5. A faucet mixing valve as defined in claim 1 further characterized by;

a flat bearing member being positioned such that a lower surface thereof slidably abuts an upper surface of said collar bearing and an upper surface of said flat bearing member abuts a sealing member lower periphery about said ball valve, said flat bearing member constructed to be relatively stationary as said collar bearing and said ball valve are rotated about the longitudinal axis of said housing body.

6. A faucet mixing valve as defined in claim 1 further characterized by;

said second projection is rigidly affixed to said collar bearing and pivotably connected to said ball valve.

7. A faucet mixing valve as define in claim 6 further characterized by;

said second projection being formed by a distal end of a pin that passes through said ball valve, said pin having opposite distal ends that extend outwardly from said ball valve surface and each being affixed to said collar bearing member.

8. A faucet mixing valve as define in claim 1 further characterized by;

said second projection being formed by a distal end of a pin that passes through said ball valve, said pin having opposite distal ends that extend outwardly from said ball valve surface and each being connected to said collar bearing member.

9. A faucet mixing valve as defined in claim 1 further characterized by;

said plurality of openings of said ball valve being shaped and positioned on said ball valve with respect to said ports in said body such that when said ball valve is in a position to provide for a mix of hot and cold water through said mixing valve, said ball valve provides a temperature shift toward a predefined comfort temperature when the ball valve is adjusted from a throttled position in proximity to an off position toward a full flow position.

10. A faucet mixing valve as defined in claim 1 further characterized by;

said ball valve having at least one opening for allowing entry of cold water from one of said ports and at least one opening for allowing entry of hot water from another of said ports; and one of said openings through said ball valve having a concave edge section to modulate flow through said opening.

11. A faucet mixing valve as defined in claim 10 further characterized by;

said ball valve having at least two openings for allowing entry of cold water from one of said ports and at least two openings for allowing entry of hot water from another of said ports; and one of said openings for allowing entry of cold water having a concave edge section to modulate flow therethrough; and one of said openings for allowing entry of hot water having a concave edge section to modulate flow therethrough.

12. A faucet mixing valve as defined in claim 11 further characterized by;

said openings with said respective concave edge having a peripheral shape defined by at least five radial arcs having a respective radial center; and at least four of said radial centers located within the periphery of said respective opening and one radial center located outside of the periphery of said opening at the side of the concave edge section.

13. A faucet mixing valve as defined in claim 11 further characterized by;

said openings with said respective concave edge having a peripheral shape defined by at least five radial arcs having a respective radial center;

at least four of said radial centers located within the periphery of said respective opening and one radial center located outside of the periphery of said opening at the side of the concave edge section;

the remaining openings having convex peripheries defined by at least five radial arcs having a respective radial center; and at least two of the radial arcs of each opening are joined at a point sharing a common tangent line.

14. A faucet mixing valve as defined in claim 13 further characterized by;

each of said radial arcs being joined to one of another radial arc at a point sharing a common tangent line and a straight line at a point having a tangent line coinciding with said straight line.

15. A faucet mixing valve as defined in claim 14 further characterized by;

said openings including a full cold water opening constructed and positioned for allowing only cold water entry when said hot water port is closed off, a mixed cold water opening positioned and constructed for allowing cold water entry simultaneously with hot water entry from said hot water port, a full hot water opening constructed and positioned for allowing only hot water entry when said cold water port is closed off, and a mixed hot water opening positioned and constructed for allowing hot water entry simultaneously with cold water entry from said cold water port;

said full cold water opening having said respective concave edge; and said mixed hot water opening having said respective concave edge.

16. A faucet mixing valve as defined in claim 11 further characterized by;

said openings including a full cold water opening constructed and positioned for allowing only cold water entry when said hot water port is closed off, a mixed cold water opening positioned and constructed for allowing cold water entry simultaneously with hot water entry from said hot water port, a full hot water opening constructed and positioned for allowing only hot water entry when said cold water port is closed off, and a mixed hot water opening positioned and constructed for allowing hot water entry simultaneously with cold water entry from said cold water port;

said full cold water opening having said respective concave edge opposing a near edge of said cold water port when said ball valve is positioned in an off-full-cold position; and said mixed hot water opening having said respective concave edge opposing a near edge of said hot water port when said ball valve is positioned in a full-on-full cold position.

17. A faucet mixing valve as defined in claim 16 further characterized by;

a mixed cold water opening having a straight edge section opposing an edge of said cold water port when said ball valve is in an off-mix position; and a mixed hot water opening having a straight edge section opposing an edge of said hot water port when said ball valve is in said off-mix position.

18. A faucet mixing valve as defined in claim 17 further characterized by;

said openings with said respective concave edge having a peripheral shape defined by at least five radial arcs having a respective radial center;

at least four of said radial centers located within the periphery of said respective opening and one radial center located outside of the periphery of said opening at the side of the concave edge section;

the remaining openings having convex peripheries defined by at least five radial arcs having a respective radial center; and at least two of the radial arcs of each opening are joined at a point sharing a common tangent line;

each of said radial arcs being joined to one of another radial arc at a point sharing a common tangent line and a straight line at a point having a tangent line coinciding with said straight line.

19. A faucet mixing valve as defined in claim 18 further characterized by;

said plurality of openings of said ball valve being shaped and positioned on said ball valve with respect to said ports in said body such that when said ball valve is in a position to provide for a mix of hot and cold water through said mixing valve, said ball valve provides a temperature shift toward a predefined comfort temperature when the ball valve is adjusted from a throttled position in proximity to an off position toward a full flow position.

20. In a ball valve for a faucet mixer valve, said ball valve characterized by;

a substantially spherical shaped valve surface;

a plurality of openings in said valve surface and in fluid communication with each other;

a first projection extending from said valve surface for driving said ball valve when mounted in a valve body; and a circular collar bearing mounted about said ball valve surface for pivotable motion about an axis substantially perpendicular to said first projection.

21. A ball valve as defined in claim 20 further characterized by;

said ball valve having a second projection extending outwardly from said ball valve surface and being positioned perpendicular to said first projection and extending from said ball valve surface substantially at a perpendicular angle; and said second projection connected to said collar bearing for pivotably connecting said collar bearing to said ball valve.

22. A ball valve as defined in claim 21 further characterized by;

said second projection formed by a pin passing through said ball valve and centrally positioned to pass through the center of said ball valve and being perpendicular to said first projection; and said pin having at two opposite distal ends positioned to the exterior of the ball valve surface and connected to said collar bearing at each opposite distal end.

23. A ball valve as defined in claim 21 further characterized by;

said distal ends of said pin being rigidly affixed to said collar bearing and mounted to said ball valve surface for relative pivotal motion with respect thereto.

24. A ball valve as defined in claim 23 further characterized by;

said collar bearing has at least one radially outwardly extending cam section.

25. A ball valve as defined in claim 20 further characterized by;

said collar bearing has at least one radially outwardly extending cam section.

26. A ball valve as defined in claim 20 further characterized by;

said ball valve having at least one opening for allowing entry of cold water from one of said ports and at least one opening for allowing entry of hot water from another of said ports; and one of said openings through said ball valve having a concave edge section to modulate flow through said opening.

27. A ball valve as defined in claim 26 further characterized by;

said ball valve having at least two openings for allowing entry of cold water from a first port of a mixing valve body and at least two openings for allowing entry of hot water from a second port in said mixing valve body; and one of said openings for allowing entry of cold water having a concave edge section to modulate flow therethrough; and one of said openings for allowing entry of hot water having a concave edge section to modulate flow therethrough.

28. A ball valve as defined in claim 27 further characterized by;

said openings with said respective concave edge having a peripheral shape defined by at least five radial arcs having a respective radial center; and at least four of said radial centers located within the periphery of said respective opening and one radial center located outside of the periphery of said opening at the side of the concave edge section.

29. A ball valve as defined in claim 27 further characterized by;

said openings with said respective concave edge having a peripheral shape defined by at least five radial arcs having a respective radial center;

at least four of said radial centers located within the periphery of said respective opening and one radial center located outside of the periphery of said opening at the side of the concave edge section;

the remaining openings having convex peripheries defined by at least five radial arcs having a respective radial center; and at least two of the radial arcs of each opening are joined at a point sharing a common tangent line.

30. A ball valve as defined in claim 29 further characterized by;

each of said radial arcs being joined to one of another radial arc at a point sharing a common tangent line and a straight line at a point having a tangent line coinciding with said straight line.

31. A ball valve as defined in claim 30 further characterized by;

said openings including a full cold water opening constructed and positioned for allowing only cold water entry when said ball valve is positioned in a mixing valve body such that said second port is closed off, a mixed cold water opening positioned and constructed for allowing cold water entry from said first port simultaneously with hot water entry from said second port, a full hot water opening constructed and positioned for allowing only hot water entry when said ball valve is positioned in said mixing valve body such that said first port is closed off, and a mixed hot water opening positioned and constructed for allowing hot water entry from said second port simultaneously with cold water entry from said first port;

said full cold water opening having said respective concave edge; and said mixed hot water opening having said respective concave edge.

32. A ball valve as defined in claim 27 further characterized by;

said openings including a full cold water opening constructed and positioned for allowing only cold water entry when said ball valve is positioned in a mixing valve body such that said second port is closed off, a mixed cold water opening positioned and constructed for allowing cold water entry from said first port simultaneously with hot water entry from said second port, a full hot water opening constructed and positioned for allowing only hot water entry when said ball valve is positioned in said mixing valve body such that said first port is closed off, and a mixed hot water opening positioned and constructed for allowing hot water entry from said second port simultaneously with cold water entry from said first port;

said full cold water opening having said respective concave edge opposing a near edge of said first port when said ball valve is positioned in an off-full-cold position; and said mixed hot water opening having said respective concave edge opposing a near edge of said second port when said ball valve is positioned in a full-on-full cold position.

33. A ball valve as defined in claim 32 further characterized by;

a mixed cold water opening having a straight edge section opposable to an edge of said first port when said ball valve is in an off-mix position; and a mixed hot water opening having a straight edge section opposable to an edge of said second port when said ball valve is in said off-mix position.

34. A faucet mixing valve as defined in claim 33 further characterized by;

said openings with said respective concave edge having a peripheral shape defined by at least five radial arcs having a respective radial center;

at least four of said radial centers located within the periphery of said respective opening and one radial center located outside of the periphery of said opening at the side of the concave edge section;

the remaining openings having convex peripheries defined by at least five radial arcs having a respective radial center; and at least two of the radial arcs of each opening are joined at a point sharing a common tangent line;

each of said radial arcs being joined to one of another radial arc at a point sharing a common tangent line and a straight line at a point having a tangent line coinciding with said straight line.

35. A faucet mixing valve as defined in claim 34 further characterized by;

said plurality of openings of said ball valve being shaped and positioned on said ball valve with respect to said ports in said body such that when said ball valve is in a position to provide for a mix of hot and cold water through said mixing valve, said ball valve provides a temperature shift toward a predefined comfort temperature when the ball valve is adjusted from a throttled position in proximity to an off position toward a full flow position.

36. In a ball valve pivotably mountable in a valve receiving cavity of a faucet housing body, said body having a plurality of ports in fluid communication with said cavity, said ball valve having a plurality of openings in an outer at least partially spherical valve surface, said openings cooperating with said ports to control liquid flow in both flow rate and temperature mix through said ports, said ball valve having a control stem connected thereto and extendable through a control opening in said faucet body, the improvement characterized by;

one of said openings through said ball valve having a concave edge section to modulate flow through said opening;

said ball valve having at least two openings for allowing entry of cold water from a first port of a mixing valve body and at least two openings for allowing entry of hot water from a second port in said mixing valve body; and said openings with said respective concave edge having a peripheral shape defined by at least five radial arcs having a respective radial center; and at least four of said radial centers located within the periphery of said respective opening and one radial center located outside of the periphery of said opening at the side of the concave edge section.

37. A ball valve as defined in claim 36 further characterized by;

said openings with said respective concave edge having a peripheral shape defined by at least five radial arcs having a respective radial center;

at least four of said radial centers located within the periphery of said respective opening and one radial center located outside of the periphery of said opening at the side of the concave edge section;

the remaining openings having convex peripheries defined by at least five radial arcs having a respective radial center; and at least two of the radial arcs of each opening are joined at a point sharing a common tangent line.

38. A ball valve as defined in claim 36 further characterized by;

each of said radial arcs being joined to one of another radial arc at a point sharing a common tangent line and a straight line at a point having a tangent line coinciding with said straight line.

39. A ball valve as defined in claim 38 further characterized by;

one of said openings for allowing entry of cold water having a concave edge section to modulate flow therethrough; and one of said openings for allowing entry of hot water having a concave edge section to modulate flow therethrough.

40. A ball valve as defined in claim 39 further characterized by;

said openings including a full cold water opening constructed and positioned for allowing only cold water entry when said ball valve is positioned in a mixing valve body such that said second port is closed off, a mixed cold water opening positioned and constructed for allowing cold water entry from said first port simultaneously with hot water entry from said second port, a full hot water opening constructed and positioned for allowing only hot water entry when said ball valve is positioned in said mixing valve body such that said first port is closed off, and a mixed hot water opening positioned and constructed for allowing hot water entry from said second port simultaneously with cold water entry from said first port;

said full cold water opening having said respective concave edge; and said mixed hot water opening having said respective concave edge.

41. A ball valve as defined in claim 36 further characterized by;

said openings including a full cold water opening constructed and positioned for allowing only cold water entry when said ball valve is positioned in a mixing valve body such that said second port is closed off, a mixed cold water opening positioned and constructed for allowing cold water entry from said first port simultaneously with hot water entry from said second port, a full hot water opening constructed and positioned for allowing only hot water entry when said ball valve is positioned in said mixing valve body such that said first port is closed off, and a mixed hot water opening positioned and constructed for allowing hot water entry from said second port simultaneously with cold water entry from said first port;

said full cold water opening having said respective concave edge opposing a near edge of said first port when said ball valve is positioned in an off-full-cold position; and said mixed hot water opening having said respective concave edge opposing a near edge of said second port when said ball valve is positioned in a full-on-full cold position.

42. A ball valve as defined in claim 41 further characterized by;

a mixed cold water opening having a straight edge section opposable to an edge of said first port when said ball valve is in an off-mix position; and a mixed hot water opening having a straight edge section opposable to an edge of said second port when said ball valve is in said off-mix position.

43. A faucet mixing valve as defined in claim 42 further characterized by;

said openings with said respective concave edge having a peripheral shape defined by at least five radial arcs having a respective radial center;

at least four of said radial centers located within the periphery of said respective opening and one radial center located outside of the periphery of said opening at the side of the concave edge section;

the remaining openings having convex peripheries defined by at least five radial arcs having a respective radial center; and at least two of the radial arcs of each opening are joined at a point sharing a common tangent line;

each of said radial arcs being joined to one of another radial arc at a point sharing a common tangent line and a straight line at a point having a tangent line coinciding with said straight line.

44. A faucet mixing valve as defined in claim 43 further characterized by;

said plurality of openings of said ball valve being shaped and positioned on said ball valve with respect to said ports in said body such that when said ball valve is in a position to provide for a mix of hot and cold water through said mixing valve, said ball valve provides a temperature shift toward a predefined comfort temperature when the ball valve is adjusted from a throttled position in proximity to an off position toward a full flow position.

* * * * *